No. 719,118. PATENTED JAN. 27, 1903.
J. HURCK.
COASTER BICYCLE BRAKE.
APPLICATION FILED NOV. 18, 1901.
NO MODEL. 3 SHEETS—SHEET 1.

Witnesses:
J. Hugo Grimm
Norfleet Hill

John Hurck,
Inventor,
by Hugh K. Wagner,
His Attorney.

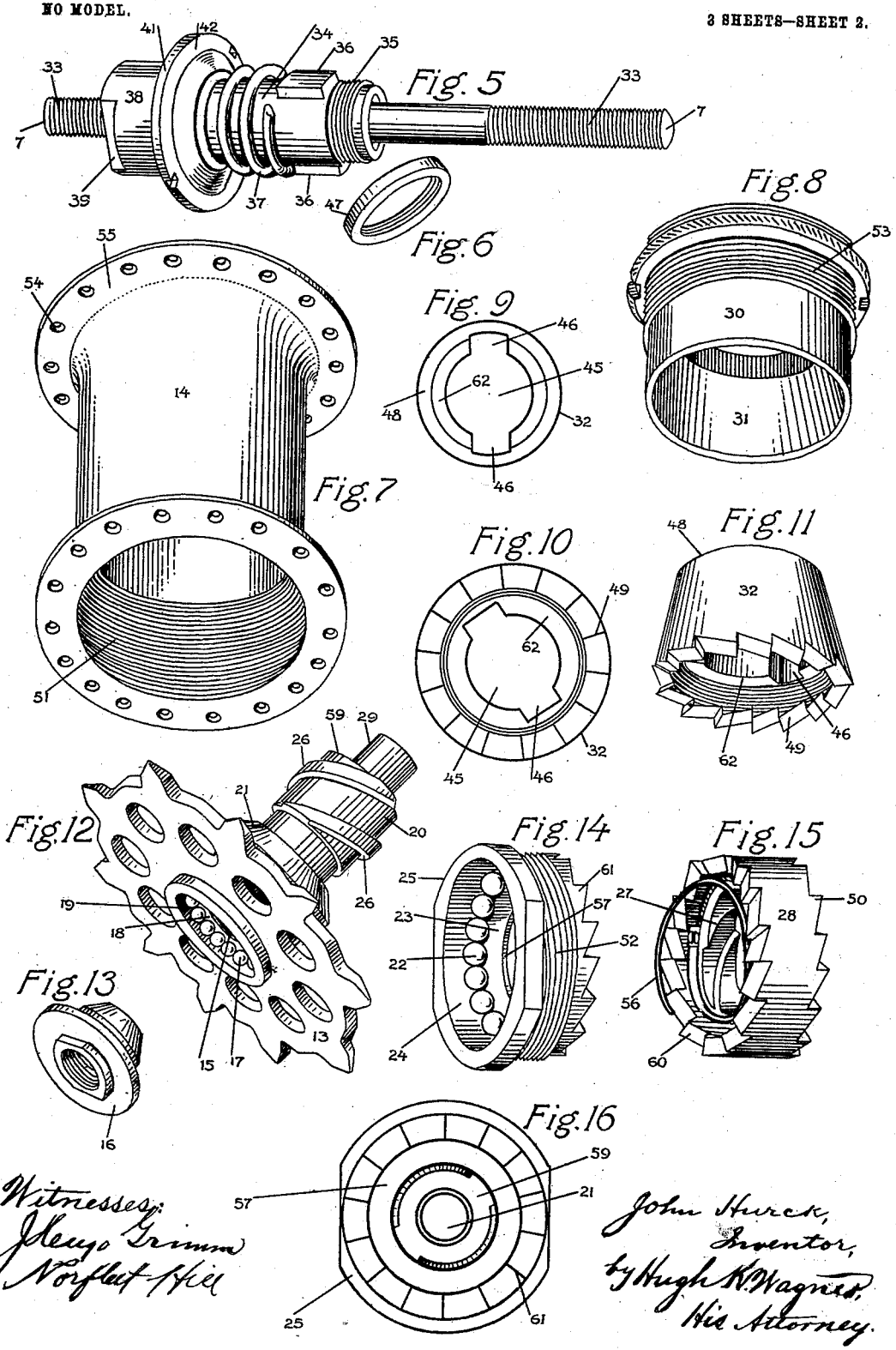

No. 719,118. PATENTED JAN. 27, 1903.
J. HURCK.
COASTER BICYCLE BRAKE.
APPLICATION FILED NOV. 18, 1901.
NO MODEL. 3 SHEETS—SHEET 3.

WITNESSES:

INVENTOR:
John Hurck,
BY Hugh K. Wagner,
His ATTORNEY

UNITED STATES PATENT OFFICE.

JOHN HURCK, OF ST. LOUIS, MISSOURI.

COASTER BICYCLE-BRAKE.

SPECIFICATION forming part of Letters Patent No. 719,118, dated January 27, 1903.

Application filed November 18, 1901. Serial No. 82,613. (No model.)

*To all whom it may concern:*

Be it known that I, JOHN HURCK, a citizen of the United States, residing at St. Louis, in the State of Missouri, have invented certain new and useful Improvements in Coaster Bicycle-Brakes, of which the following is a full, clear, and exact description, such as will enable others skilled in the art to which it appertains to make and use the same.

This invention relates to brakes for bicycles, automobiles, or other vehicles, and has for its object to provide a brake which will operate certainly and in a positive manner. It is adapted to be used in connection with bicycles or automobiles of ordinary construction, and it will be hereinafter fully described and the features of novelty pointed out in the appended claims.

Reference is to be had to the accompanying drawings, forming part of this specification, in which similar figures of reference denote like parts in all the figures.

Figure 1:
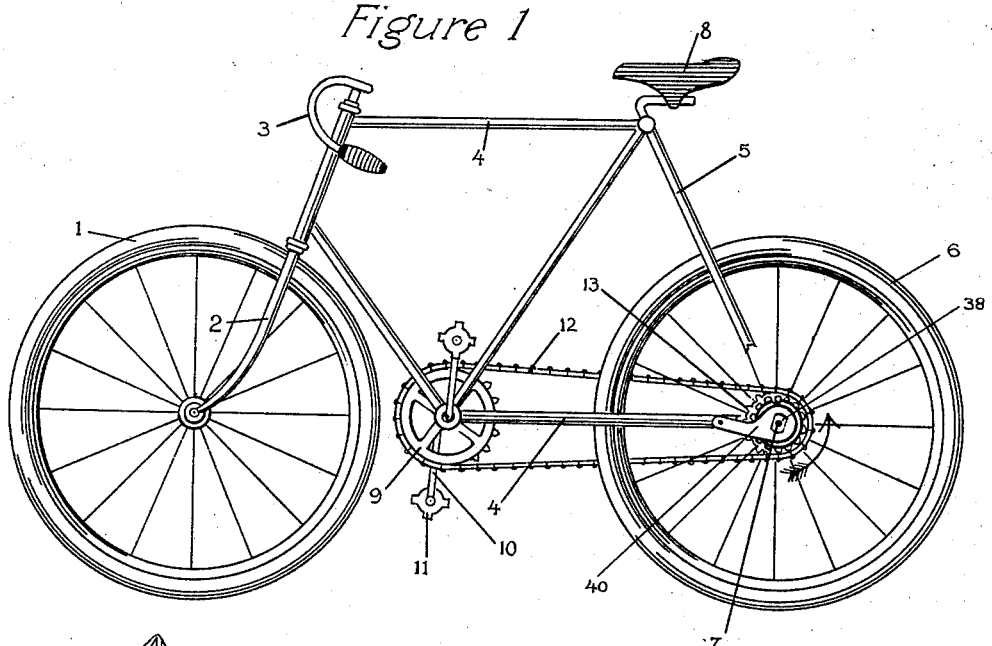
Figure 2:
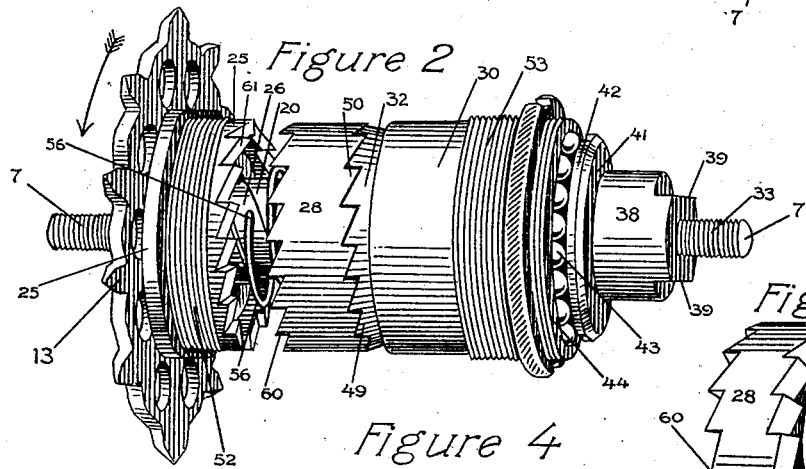
Figure 4:
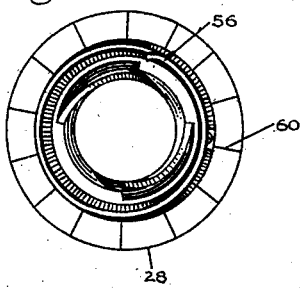
Figure 3:
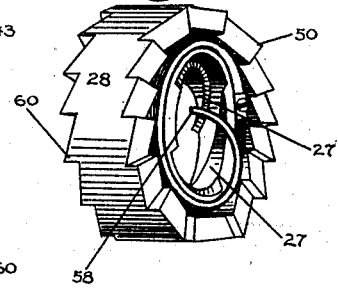
Figure 17:
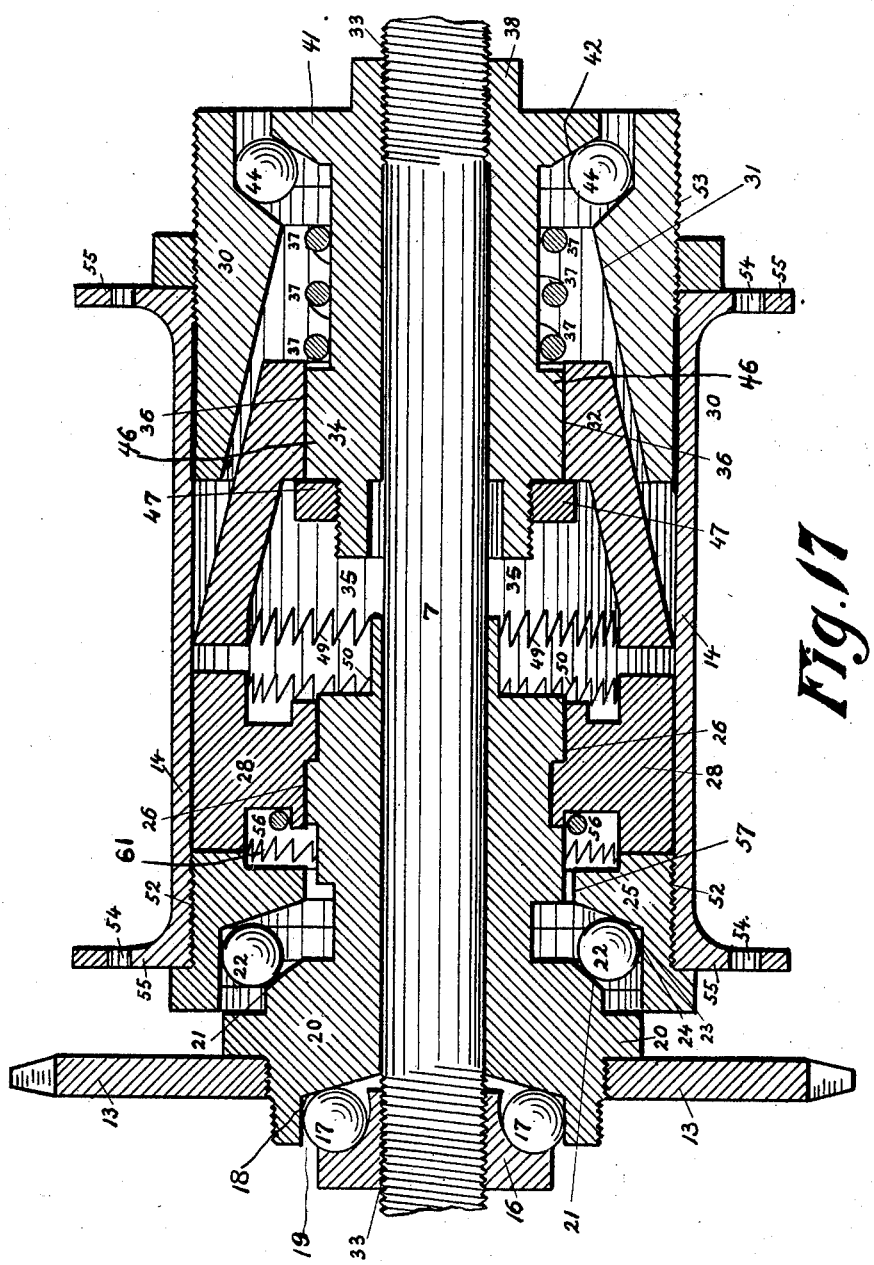

Figure 1 is a side elevation of a bicycle. Fig. 2 is a perspective view showing the relation of the most important parts of my device when assembled and in the braking position. Fig. 3 is a view of the movable ring 28 with the spring carried thereby. Fig. 4 is a side view of an alternative form of construction of the movable ring 28, showing the spring borne thereby of a different shape and carried upon the opposite side of ring 28 from that shown in Fig. 3. Fig. 5 is a perspective view of the hollow cylinder through which the axle passes located at the end opposite to the rear sprocket-wheel and showing in position thereon the spring 37. Fig. 6 is a detail of the nut 47. Fig. 7 is a perspective view of the barrel or hub, showing the interior threads at one end thereof. Fig. 8 is a perspective view of the cup-shaped nut containing the female friction-cone. Fig. 9 is an end view of the small end of the male friction-cone. Fig. 10 is an end view of the large and serrated end of the same. Fig. 11 is a perspective view of the same, showing the serrations, the interior threads, and interior grooves. Fig. 12 is a perspective view of the rear sprocket-wheel and threaded spindle. Fig. 13 is a detail in perspective of the nut and journal against which said sprocket-wheel bears on its outer side. Fig. 14 is a perspective view of the serrated ring and ball-bearings against which said sprocket bears on its opposite side. Fig. 15 is a perspective view of the movable member which engages at will either indirectly the propelling mechanism or directly the braking mechanism. Fig. 16 is an end view of the hollow threaded spindle and a side view of ring 25. Fig. 17 is a central longitudinal sectional view taken longitudinally through the center of Fig. 2.

In the said drawings, 1 designates the front wheel of a bicycle; 2, the fork; 3, the handle-bar; 4, the frame; 5, the rear fork; 6, the rear wheel; 7, its shaft or axle; 8, the saddle; 9, the driving-sprocket; 10, the cranks; 11, the pedals, and 12 the sprocket-chain connected with the sprocket 13, loosely mounted on the axle of the rear wheel 6. These parts may be of any ordinary or suitable construction and form no part of the present invention.

Mounted to revolve on the shaft or axle 7 and surrounding same is the driving-wheel 6. The spokes of this wheel are attached to the barrel or hub 14 in the usual manner by means of the perforations 54 in the annular flanges 55 thereof. The barrel or hub incloses all the parts composing the brake itself, as well as the member hereinafter described, which acts, with the rear sprocket-wheel 13, to drive the wheel 6. The rear sprocket-wheel 13 is located adjacent but exterior to said barrel or hub 14. One end of axle 7 passes through the opening 15 in said sprocket 13, which revolves loosely around that end of the axle. A nut 16 at the end of said axle 7, but within the fork 5, holds antifriction-balls 17 between it and the cup 18, provided in the recess 19 near the center of the outer face of said sprocket-wheel. The sprocket-wheel 13 is mounted upon a hollow spindle 20, through the bore of which the axle 7 passes. The spindle 20 and the sprocket 13, secured thereto, are thus borne by the axle 7. The spindle 20 has a cone 21, upon which antifriction-balls 22 roll, said balls being arranged in the cup 23 within the dished recess 24 in the ring 25, whereby the friction between the said spindle and ring is reduced to a minimum. The uses of this ring will be hereinafter described.

The spindle 20 has screw-threads 26, which coöperate with corresponding threads 27 inside the ring or movable member 28, and the coöperation of these threads 26 and 27 causes said ring 28 to move to the right or to the left, as will be hereinafter described. The threads 26 on the spindle 20 may be of any desired length or form; but I have shown them extending approximately from the cone 21 to a point adjacent to the inner end of said spindle. The diameter of said spindle I have, however, shown reduced near its inner end, as at 29. The ring 28 has a spring 56 located between it and the ring 25, with an interior annular flange 57, of which its end is adapted to engage. In the drawings I have shown this spring attached to and carried by ring 28. In Fig. 3 of the drawings I have shown a modified arrangement of this spring, in which instead of being located on the side of the movable member 28 nearest the sprocket-wheel and bearing against the flange 57 it appears upon the opposite side of said movable member 28, and its end 58 is curved farther inward, so as to be adapted to strike against the end 59 of the spindle 20. However constructed or arranged, the function of this spring is to tend to keep the serrations on ring 28 out of engagement with those on ring 25.

The axle 7 has surrounding the same the member 30, which is cup-shaped and has its interior partially, at least, concavely shaped, so as to form a female friction-surface 31. The male friction-cone 32 is mounted upon the axle 7 and in a manner making it capable of longitudinal movement thereon in order that it may at times coact with the friction-surface 31 and at others remain inactive borne by said axle 7. The male friction-cone 32 is mounted upon the axle in the following manner. The axle 7 is externally screw-threaded at its ends, as at 33. Screwed a suitable distance in upon said axle 7 is a hollow cylinder 34, exteriorly screw-threaded at its inner end 35 and provided with bearing fins or projections 36, formed integral with the said cylinder adjacent its inner end. 37 indicates a coiled spring encircling the said hollow cylinder 34 and being arranged between the said projections 36 and the shoulder 41 of the nut 38, said nut being provided with shoulders 39, of which the clamp 40 takes hold. The latter being attached at its other end to the frame 4 prevents said nut 38 and the hollow cylinder 34, upon which same is formed, from rotating. The nut 38 has a shoulder 41, which has attached thereto or formed integral therewith a cone 42, between which and the recessed end 43 of the cup-shaped nut 30 are located balls 44. The male friction-cone has a longitudinal opening 45 through its center and surrounds the hollow cylinder 34 and has grooves 46 formed within said longitudinal opening 45, into which the fins or projections 36 fit, thus preventing the rotation of said male friction-cone, but admitting of longitudinal movement of the same. This longitudinal movement is limited in one direction by the threaded ring or nut 47, which screws upon the threaded end portion 35 of the hollow cylinder 34 and abuts against the flange 62 within the cone. The male friction-cone 32 is normally kept out of engagement with the friction-surface 31 by the spring 37, (which is shown as a coiled spring, but may be of any other variety,) which bears against the inner end 48 of said male friction-cone 32. The longitudinal movement of the male friction-cone 32 in this direction is limited only by the strongest possible frictional contact with the female friction-surface 31. Such frictional contact is for braking purposes and is primarily produced by the interlocking of the serrated edge 49 of said male friction-cone and the adjacent serrated edge 50 of the threaded ring 28. In the longitudinal movement for such braking purposes the ring 28 pushes the male friction-cone 32 in such a degree as to overcome the resistance of the spring 37.

The barrel or hub 14 is interiorly screw-threaded at its ends, as indicated at 51, which threads coöperate with threads 52 on the ring 25 and at its other end with the threads 53 on the cup-shaped nut 30.

The operation of my device is as follows: When the bicycle is going forward, as in ordinary travel, the sprocket-wheel 13 moves in the direction indicated by the arrow in Figs. 1 and 2. The sprocket-wheel is, practically speaking, fixed to the outer end of the spindle 20. The threads 26 on said spindle move in response to the rotation of the sprocket-wheel 13, and as they coöperate with the threads 27 within the ring 28 this causes the movable member 28 to overcome the resistance of the spring 56, and the serrations 61 on the ring 25 grip the last-mentioned serrations firmly, and thus the ring 28 and the ring 25 rotate as one piece with the sprocket-wheel. The operation of the parts being reversed, as by back-pedaling, the sprocket-wheel revolves in the direction opposite to the arrows. The spindle 20 turns in the same direction, and the threads 26 thereon, by means of the threads 27 in the ring 28, cause the latter to move longitudinally toward the male friction-cone 32 and by means of their adjacent serrated edges 50 and 49 to clutch or grip the same and to press same firmly into the female friction-cone 31.

Fig. 2 shows the position of the parts when the brake is in its effective position for braking purposes. When the brake is not in operation, but the machine is being propelled by the pedals, the ring 28, instead of being in engagement with cone 32, as shown in Fig. 2, will be in engagement with ring 25. In both cases the engagement is effected by means of the serrations upon the edges of the respective pieces. This makes a much firmer contact than an ordinary frictional contact and is practically a clutch from which the engaging pieces cannot escape until the actuating force is removed.

When the pedals are not being operated to propel the bicycle nor backed to brake the same, as in coasting, a single backward push on the pedals 11 separates ring 28 from ring 25, or the same will be accomplished by the momentum of the wheel 6 upon merely ceasing to pedal, and the spring 56 causes ring 28 to remain disengaged from ring 25 and to ride free.

I am aware that many minor changes may be made in the form and arrangement of the parts of my invention without departing from the nature and spirit thereof as defined in the claims.

Having thus described my invention, what I claim, and desire to secure by Letters Patent, is—

1. In a bicycle-brake, a pair of sprocket-wheels, a sprocket-chain engaging same, a threaded member to which one of said sprocket-wheels is secured, a serrated member encircling said threaded member, a ring serrated upon both sides and interiorly threaded with threads corresponding with said threaded member, a friction-cone having its inner end serrated, and a hub provided with a coöperating concave bearing-surface.

2. In a bicycle-brake, the combination with the hub provided with a concave bearing-surface, a notched member secured to the opposite end of the hub, and the axle of a threaded spindle journaled on the axle, of a movable member provided with interiorly-arranged threads corresponding with the threads on said spindle, a sleeve secured to the axle, and a brake member movable on the said sleeve and having its inner end serrated, substantially as described.

3. The combination with the axle, of a spindle revolubly mounted on the axle and provided with exterior threads, a sprocket-wheel rigidly secured to the outer end of the said spindle, a hub, a ring secured to the hub and having its inner edge serrated, a hollow cylinder journaled on the said axle, a friction-cone slidably mounted on the said cylinder, and having its inner end serrated, a coöperating friction-surface carried by the hub, and a movable member having its opposite edges serrated, said movable member being provided with interior screw-threads engaging the thread of the said spindle, substantially as described.

4. In a bicycle-brake, the combination with the wheel-axle and the sprocket-wheel, of a threaded spindle revolubly mounted upon the axle, said sprocket-wheel being rigidly secured to the said spindle, a hub, a ring secured to the hub, a movable member provided with an interiorly-threaded portion in engagement with the threads of the said spindle and having its opposite edges serrated, and a slidable friction-cone having its inner edge serrated, which edge is engaged by the said ring when the said axle is revolved rearwardly.

5. In a bicycle-brake, the combination of sprocket-wheels and sprocket-chain, an axle, a hub, friction members encircling said axle, one of which has its inner edge serrated, a threaded spindle upon which the rear sprocket-wheel is mounted, a serrated ring secured to the hub, a movable member traveling on said spindle, the same being screw-threaded internally and notched on its edges, and being located between said friction members and said serrated ring.

6. In a bicycle-brake, the combination of the sprocket-wheel, an axle, a hub having a concave bearing-surface, an externally-screw-threaded spindle upon which the said sprocket-wheel is mounted, a movable member mounted on said spindle, said member being internally screw-threaded, and provided on its opposite edges with serrations, a ring rigidly secured to the hub and having its inner edge serrated, and a stationary cone coöperating with the bearing-face of the said hub, said cone having its inner edge serrated.

7. In a bicycle-brake, the combination with the vehicle-hub, a sprocket-wheel and axle, of a spindle journaled on the shaft, and having its outer end rigidly secured to the said sprocket-wheel, a ring encircling the said spindle and being secured to the said hub, said ring having its inner face serrated, a member slidably mounted on said spindle and having its opposite edges serrated, a hollow cylinder secured to the said axle, a friction-cone slidably mounted on said cylinder and having its inner end serrated, and a nut secured to the said hub and provided with an interior friction-surface to be engaged by the said cone.

8. In a bicycle-brake, the combination of sprocket-wheels, an axle, a stationary friction-cone, a nut secured to the said hub and provided with a conical bearing-surface, a spindle connected with the rear sprocket-wheel, a member notched on both sides alternately operated in either direction by said spindle, and a serrated ring upon one side of said movable member, said ring being secured to the vehicle-hub.

9. In a bicycle-brake, the combination of sprocket-wheels, an axle, a spindle connected to the rear sprocket-wheel, and provided with exterior threads, a threaded serrated member mounted on said spindle and alternately operatable in either direction, a serrated ring upon one side of said movable member, a notched friction-cone upon the other side of said movable member, and a friction member secured to the said hub coöperating with the said cone when the brake is operating.

10. In a bicycle-brake, the combination with the hub, and the axle journaled therein, of a spindle loosely mounted upon the axle, and having its exterior provided with screw-threads, a sprocket-wheel secured to the outer end of the spindle, a ring detachably secured to the hub, and having its inner edge serrated, a movable member having its interior screw-threaded and in engagement with the screw-threads of the said spindle, and having its opposite edges serrated, a cylindrical sleeve secured to the said axle, and coöperating brake members, one of which is secured to the hub, and the other movable on the said sleeve and having its inner edge serrated, substantially as described.

In testimony whereof I have hereunto set my hand, in the presence of two witnesses, this 15th day of November, 1901.

JOHN HURCK.

Witnesses:
HUGH K. WAGNER,
FAY CHAMBERLAIN.